United States Patent
Dalal et al.

(10) Patent No.: US 7,160,593 B2
(45) Date of Patent: *Jan. 9, 2007

(54) POLYEFINIC PIPE HAVING A CHLORINATED POLYOLEFINIC HOLLOW CORE

(75) Inventors: Girish T. Dalal, Avon Lake, OH (US); Arthur L. Backman, Broadview Heights, OH (US); Andrew M. Olah, Spencer, OH (US); Theodore J. Schmitz, Avon, OH (US); Andrew L. Auvil, Brecksville, OH (US); Michael D. Vaughn, Strongsville, OH (US); James J. Dedrick, Medina, OH (US)

(73) Assignee: Noveon, Inc., Cleveland, OH (US)

( * ) Notice: Subject to any disclaimer, the term of this patent is extended or adjusted under 35 U.S.C. 154(b) by 250 days.

This patent is subject to a terminal disclaimer.

(21) Appl. No.: 10/616,421

(22) Filed: Jul. 9, 2003

(65) Prior Publication Data

US 2004/0028860 A1 Feb. 12, 2004

Related U.S. Application Data

(60) Provisional application No. 60/397,919, filed on Jul. 23, 2002.

(51) Int. Cl.
*B32B 1/08* (2006.01)
*B32B 27/08* (2006.01)
*B32B 27/32* (2006.01)
*B29D 23/00* (2006.01)
*F16L 11/04* (2006.01)
*F16L 9/133* (2006.01)
*C08F 283/00* (2006.01)

(52) U.S. Cl. .................. 428/36.91; 428/35.7; 428/36.5; 428/36.9; 428/515; 428/516; 428/518; 428/519; 428/523; 138/137; 138/140; 138/141; 525/356; 525/416

(58) Field of Classification Search .............. 428/35.7, 428/36.6, 36.9, 515, 516, 518, 36.91, 519, 428/523; 138/137, 140, 141; 525/356, 416

See application file for complete search history.

(56) References Cited

U.S. PATENT DOCUMENTS 3,110,709 A 11/1963 Canterino .................. 260/94.9

(Continued)

FOREIGN PATENT DOCUMENTS

JP 01 026084 1/1989

(Continued)

OTHER PUBLICATIONS

Standards Australia, AS 2492-1994, "Cross-Linked Polyethylene (PE-X) Pipe For Hot And Cold Water Applications", pp. 5-28.
P. Vibien, et al., "Chlorine Resistance Testing of Cross-Linked Polyethylene Piping Materials".

*Primary Examiner*—Jennifer C. McNeil
*Assistant Examiner*—Chris Bruenjes
(74) *Attorney, Agent, or Firm*—Joe A. Powell

(57) ABSTRACT

A multi-layered pipe of arbitrary length and cross-section is produced by co-extrusion of a lower polyolefin ($C_2$–$C_4$) outer body over the exterior surface of a tubular core of randomly, partially randomly, or blocky chlorinated lower polyolefin, the core having a wall thickness, measured in the radial direction, in the range from about 0.025 mm to 5 mm. The tubular core is coextensive with essentially the entire length of the pipe. The tubular core comprises a major proportion by weight of the randomly chlorinated polyolefin (r-CPO), or, partially randomly chlorinated polyolefin (pr-CPO), or, a blocky chlorinated polyolefin (b-CPO), any of which may be blended with a minor proportion by weight of a blending ingredient. The r-CPO, pr-CPO or b-CPO, or a blend thereof, each has an extrusion temperature in the same range as that for the corresponding non-halogenated polyolefin, namely in the range from about 150° C. to 250° C.

13 Claims, 1 Drawing Sheet

U.S. PATENT DOCUMENTS

| | | | |
|---|---|---|---|
| 3,454,544 A | 7/1969 | Young et al. | 260/88.2 |
| 3,563,974 A | 2/1971 | Eckardt et al. | 260/94.9 |
| 4,117,195 A | 9/1978 | Swarbrick et al. | 428/379 |
| 4,351,876 A * | 9/1982 | Doi et al. | 428/349 |
| 4,559,973 A * | 12/1985 | Hane et al. | 138/138 |
| 4,614,208 A | 9/1986 | Skarelius | 138/103 |
| 5,308,695 A * | 5/1994 | Arakawa et al. | 428/354 |
| 5,525,679 A | 6/1996 | Effler, Jr. et al. | 525/334.1 |
| 5,756,023 A | 5/1998 | Stachowiak | 264/83 |
| 5,792,532 A * | 8/1998 | Pfleger | 428/36.9 |
| 6,124,406 A | 9/2000 | Cinadr et al. | 525/333.4 |
| 6,284,178 B1 | 9/2001 | Russell et al. | 264/211.24 |
| 6,287,657 B1 * | 9/2001 | Gebizlioglu | 428/36.91 |
| 6,293,311 B1 * | 9/2001 | Bushi et al. | 138/138 |
| 2001/0008663 A1 * | 7/2001 | Siour et al. | 428/36.91 |
| 2004/0020547 A1 * | 2/2004 | Mahabir et al. | 138/137 |

FOREIGN PATENT DOCUMENTS

| | | |
|---|---|---|
| JP | 2001 269403 | 10/2001 |
| WO | WO 9949254 | 9/1999 |
| WO | WO 9957474 | 11/1999 |

* cited by examiner

POLYEFINIC PIPE HAVING A CHLORINATED POLYOLEFINIC HOLLOW CORE

CROSS REFERENCE TO RELATED APPLICATION

This application is filed pursuant to Provisional Application No. 60/397,919 filed on Jul. 23, 2002.

FIELD

This invention relates to a hollow extruded body of arbitrary cross-section, typically a polyolefinic ("PO") (hereafter also "plastic") pipe such as is used in water distribution systems. Poly(lower olefinic) pipe is susceptible to oxidizing agents which, over time, diffuse through the plastic causing oxidative degradation. Such degradation of PO pipe occurs by reaction with, and diffusion of, oxygen from the atmosphere; and by reaction of oxidizing agents from the fluid in the pipe, and diffusion of oxygen into the PO from fluid in the pipe. The susceptibility of cross-linked polyethylene ("PEX") to degradation by reaction with free chlorine present in potable water, is described in an article titled "Chlorine Resistance Testing of Cross-linked Polyethylene Piping Materials" by P. Vibien, et al of Jana Laboratories Inc., Ontario, Canada, and W. Zhou et al of University of Illinois at Chicago, Chicago, Ill., U.S.A.

THE PROBLEM

Polyethylene ("PE") piping is commonly used for cold (10° C.–35° C.) water systems for potable water, irrigation at high pressure in the range from about 650 kPa (80 psig) to 1490 kPa (200 psig), and drainage waste water, a choice of LLDPE (linear low density PE), MDPE (medium density PE) or HDPE (high density PE) being directed by the conditions of usage of the pipe. Cross-linked PE ("PEX pipe") is used for domestic cold and hot water (10° C.–115° C.) as well as in radiant heating applications. Water at temperatures above 100° C., under pressure in the range from about 997 kPa (130 psig) to about 1135 kPa (150 psig), will rupture the pipe. Oxidizing agents in water, typically chlorine and hypochlorous acid within the pipe have been found to be more damaging than any oxidizing agent present in the external environment. The goal is to protect the PEX pipe against oxidative damage for a long time, up to 50 years.

BACKGROUND OF THE INVENTION

Piping made from a polymer of a lower olefin containing from 2 to about 4 carbon atoms are used in water distribution systems in which the temperature of the water is relatively low, typically less than 100° C., and the pressure of the water is less than about 790 kPa (100 psig). Such PO piping, and PEX in particular, is conventionally protected with antioxidants but is nevertheless susceptible to diffusion of oxygen and reaction with oxidizing agents entering the PO wall, both from fluid carried within the pipe and from the environment outside the pipe. To date, the extent of damage from within has been recognized and addressed by the addition of antioxidants and other formulation ingredients. To minimize diffusion of oxygen from the air into the pipe, a core of PEX is externally coated with a barrier layer of a material such as an ethylene vinyl alcohol copolymer (EVOH) using an intermediate adhesive layer, but the EVOH layer on such pipe fails to protect against oxidation from within the pipe; moreover, an EVOH layer is known to be susceptible to cracking when expanded. Adhesive is required because EVOH cannot be extruded over PE or polypropylene ("PP") or polybutylene ("PB") pipe under conditions such that the contiguous EVOH and PO surfaces are adequately self-adhered.

To overcome the mechanical limitations of PEX pipe adhesively bonded to a EVOH outer layer, a multilayer pipe is disclosed in WO 99/49254 to Johansson et al. Though no details are provided sufficient to enable one to determine the effectiveness of the combination without an undue amount of experimentation, a PEX core having an EVOH outer layer adhesively bonded (with an intermediate adhesive layer) is also coated with another layer of adhesive which is stated to prevent cracking of the pipe, which would otherwise occur, when the pipe was expanded. If one were to recognize the importance of protection from within, it is expected that one could adhesively bond a tubular (or annular) core of EVOH to the inner surface of PEX pipe, forming a barrier layer protecting the PEX against degradation from oxidizing agents and oxygen in oxygenated water containing deleterious oxidizing agents, except that EVOH hydrolyzes in water.

To cope with the problem of oxidation from within, one could extrude a twin-laminate pipe having a laminated wall formed by an outer layer of PO which is extruded over the exterior surface of a thin-walled inner tubular layer (or "core") of a material which has desirable barrier properties the PO, even if cross-linked, does not have. For potable water systems, the core would be chosen to provide an effective barrier against all oxidizing agents typically present in potable water, which agents deleteriously react with the PO outer layer, particularly if it is cross-linked polyethylene ("PEX"). The thin-walled core would desirably have a lower permeability and lower diffusion coefficient for oxygen than PEX so that the outer layer is protected against degradation from oxygenated water within the pipe. In addition, the outer layer of the twin-laminate may again be protected against oxidation with a protective cover of barrier material. Barrier materials are typically adhesively bonded to the PO layer because directly bonding a conventional barrier layer such as EVOH to the PEX by co-extrusion produces unsatisfactory bonding.

An alternative piping system which is essentially immune to degradation by oxidizing agents and substantially impermeable to oxygen is available. Such pipe is made from either poly(vinyl chloride) ("PVC") or chlorinated poly(vinyl chloride) ("CPVC"), the choice depending upon the temperature of the water and other "use" criteria. But it is well known that advantages of a PEX piping system are not available in a PVC and/or CPVC ("PVC/CPVC") piping system, and vice versa. Accordingly much effort has been devoted to producing pipe which has the advantages of both systems and the drawbacks of neither. However, neither PVC nor CPVC is directly bondable to a polyolefin surface satisfactorily; and attempts to provide an intermediate adhesive layer have, to date, failed.

U.S. Pat. No. 6,124,406 discloses that a "blocky" chlorinated polyolefin ("b-CPO") may be used to compatibilize PVC or CPVC with a polyolefin rubber ("PO-rubber") and that a blend of PVC and/or CPVC with blocky chlorinated polyethylene ("b-CPE") and a PO-rubber (familiarly referred to as an "elastomer" herein) can have a combination of good impact resistance, high heat distortion temperature (relative to the base CPVC or PVC), good tensile properties, oxidation resistance, and stability to ultraviolet light (UV)

exposure. The term "polyolefin rubber" as used herein, refers to an olefinic rubber of polymerized lower ($C_2$–$C_4$) monoolefins, e.g. ethylene-propylene rubber, and/or an olefinic rubber which in addition, contains a polymerized diene, e.g. ethylene/propylene/ethylidene norbornene rubber referred to as EPDM rubber. The term "b-CPO" refers to blocky chlorinated PO having both, high Cl content PO blocks (e.g. 50% to 75% by weight Cl) and relatively non-chlorinated crystallizable PO blocks, the b-CPO having a residual crystallinity of at least 95% (calculated as indicated in the '406 patent), and being produced without appreciably swelling the PO or melting the crystalline phase, i.e. less than 10% increase in volume due to swelling of the precursor PO at 25° C. Details of the preparation of b-CPE are set forth in the '406 patent, the disclosure of which is incorporated by reference thereto as if fully set forth herein. Blocky chlorinated PP ("b-CPP") and blocky chlorinated polybutene ("b-CPB") are made in an analogous manner by chlorination at a temperature below the melting point of the resins. Reference to "polybutene" herein includes polyisobutene.

The '406 patent disclosed that randomly chlorinated polyethylene ("r-CPE") functions as an adequate compatibilizer for PVC/CPVC and a PO-rubber, and that the properties of a blend made with b-CPE were better than those of a blend made with r-CPE. There is no comparable disclosure relating to partially randomly chlorinated polyethylene ("pr-CPE"). r-CPE may be prepared as disclosed in U.S. Pat. Nos. 3,110,709; 3,454,544; 3,563,974 or 5,525,679 to contain the desired amount of chlorine. r-CPE is rubbery and typically contains in the range from about 25% up to about 45% by weight bound Cl with heats of fusion in the range from about 0.1 to less than 15 cal/gm. r-CPE which is commercially available as Tyrin® is used as a coating for fabrics. pr-CPE may be prepared in a manner analogous to that disclosed for r-CPE above; pr-CPE may contain in the range from about 5% up to about 50% by weight bound Cl with heats of fusion in the range from about 15 to 50 cal/gm, and is distinguishable from b-CPE having a bound Cl content in the range from about 15 to about 50% in that the residual crystallinity of pr-CPE is less than that defined by the following equation $$\% \, \Delta H_R = -0.068(\% \, Cl)^2 + 2.59(\% \, Cl) + 74.71$$

in which $\Delta H_R$ is the enthalphy of fusion of residual polyethylene crystallinity (see the '406 patent).

In the range from about 15% to 20% the residual crystallinity of r-CPE and pr-CPE is approximately equal. As long as the chlorine content of the chlorinated polyolefin is in the range from 5 to 50% the residual crystallinity is not critical though higher residual crystallinity material is preferred.

It will be appreciated that the values given for the foregoing chlorinated polyethylenes are particularly directed to cores coextrudable with PEX or PE. In an analogous manner, randomly chlorinated PP and PB; partially randomly chlorinated PP and PB; and blocky PP and PB may be prepared but will have correspondingly different chlorine contents.

Providing better impact properties of a blend of immiscible polymers, such as PVC/CPVC with a polyolefin rubber, was the thrust of the '406 patent, the use of a b-CPO being directed towards a specific function, namely, as a compatibilizer or interfacial agent which was unexpectedly superior to randomly chlorinated polyolefin (r-CPO), and by inference, to partially randomly chlorinated polyolefin (pr-CPO). The effectiveness of such an agent is determined by its properties, mainly its ability to control the size of the dispersed phase, stabilize the phase against coalescence, and increase interfacial adhesion between the immiscible phases, none of which properties is correlatable with the extrudability of b-CPO as an inner layer bondable to an outer layer of PO, or the effectiveness of b-CPO as a barrier to oxidant molecules. Irrespective of the particular mechanism by which an individual compatibilizing or interfacial agent may function, there is nothing to suggest that a b-CPO compatibilizing or interfacial agent would be bondingly co-extrudable under substantially the same processing conditions as a corresponding PO chosen to be co-extrudable under matching conditions. Neither is there anything to suggest that, when so co-extruded, either r-CPO, pr-CPO or b-CPO would form a cohesive bond with a corresponding PO; in particular, there is no suggestion that either r-CPE, pr-CPE or b-CPE forms a cohesive bond with PEX.

Such a "cohesive bond" is demonstrated by co-extruding a tri-layer pipe of PEX layers with a layer of b-CPE sandwiched between the PEX layers; pulling apart the PEX layers in a ring peel test (ASTM F1281-99 section 9.3.2) showed portions of b-CPE adhering to the PEX surfaces, indicating the bonds between molecules of PEX are stronger than the bonds between molecules of b-CPE. The same is true for sandwiched r-CPE and pr-CPE layers; and analogously, for randomly chlorinated, partially randomly chlorinated and blocky other lower polyolefins, whether polypropylene or polybutene. By "twin-layer" and "tri-layer" pipe, reference is made to the poly(lower)olefin layers and not to any layer of adhesive which might additionally be included.

SUMMARY OF THE INVENTION

Oxidative damage from within a non-halogenated polyolefin ("PO") pipe in domestic water delivery is by far greater than that from outside the pipe in the environment the pipe is typically used, and such pipe is effectively protected by an internal tubular core of oxidation-resistant chlorinated polyolefin; no external protection of the PO pipe is necessary.

An outer layer of polyolefin pipe ("PO-pipe") is provided with an inner tubular barrier layer ("core") comprising a major proportion by weight of a randomly chlorinated poly(lower olefin) ("r-CPO"), and/or partially randomly chlorinated poly(lower olefin) ("pr-CPO"), and/or blocky chlorinated poly(lower olefin) ("b-CPO"), the core directly cohesively bonded to the outer layer's inner surface without an adhesive; the pr-CPO or pr-CPO-blend; and/or b-CPO, or b-CPO-blend; and/or r-CPO or r-CPO-blend; which blends either individually or together referred to as "CPO/bl-CPO", is chosen to provide an extrudate at about the same temperature and at about the same pressure at which the outer PO layer is extruded so that the mating surfaces of the halogenated (typically chlorinated) core and the non-halogenated (typically non-chlorinated) outer layer are self-adhesively bonded without any other material to provide an adhesive function.

In particular, twin-layer or tri-layer PEX pipe is preferably formed by co-extrusion in a conventional coaxial extruder as described herein, to produce a thin-walled core of "CPO/bl-CPO", having mechanical properties substantially indistinguishable from those of conventional PEX pipe of the same outside diameter, and without substantially sacrificing flexibility; in particular, the flexural modulus of a laminated extrudate of CPE/bl-CPE (CPE or blend of CPE) is no more than 20% greater than the flexural modulus of PEX, preferably no more than 15% greater.

CPO/bl-CPO as described above, stabilized with stabilizers effective at the temperature of extrusion, is readily extrudable at a temperature and pressure in the same range as that in which a chosen PO such as PEX is extrudable, so that co-extrusion of an outer layer of PO over an inner core of the CPO/bl-CPO under matching conditions results in the outer layer and core being cohesively bonded at their interface without an intermediate adhesive layer; in those instances where the choice of PO is such that a cohesive bond between the CPO/bl-CPO core and outer PO layer is not obtained, satisfactory direct bonding between the CPO/bl-CPO and the PO may result with the appropriate choice of a polymeric adhesive intermediate layer, extrudable under co-extrusion conditions for PO and CPO/bl-CPO, which co-extrusion preferably provides a cohesive bond between each contiguous layer on opposed sides of the adhesive intermediate layer. The improved oxidation resistance of the composite tubular body is obtained though the permeation rate of oxygen "P" for the chlorinated layer may be higher than that for the polyolefin layer.

A hollow multilayer extrudate of arbitrary length and cross-section, has a PO outer layer and a CPO/bl-CPO tubular core; the wall thickness of the PO outer layer conforms to mandated restrictions in the country of use, and the core has an inner diameter which is substantially the same as the minimum inner diameter mandated by commercial requirements.

A specific novel oxidation-resistant thin-walled twin-layer pipe has substantially the same outer diameter as conventional PEX pipe; the novel twin-layered pipe has an outer layer of PEX and a tubular core of b-CPE or b-CPE-blend; the extrudate has a nominal diameter in the range from about 7 mm (0.25") to about 152 mm (6") and a wall thickness in the range from about 1.57 mm (0.062") to about 17 mm (0.681") respectively as specified in ASTM F876 and F877; overall dimensions of the novel pipe meet the specifications set for its use in a chosen environment; the thickness of the core, in each case, being sufficient to substantially negate oxidative degradation of the PEX outer layer by oxidizing agents present in potable water. The core has a wall thickness, measured in the radial direction, in the range from about 25 μm (0.025 mm) to 0.5 mm depending upon the diameter of the pipe, and the wall thickness of the outer layer is essentially the same as the nominal wall thickness of conventional PEX pipe having the same nominal diameter.

pr-CPO containing from about 5% but less than 50% by weight Cl, some of which is in a crystalline PO phase, and in particular, partially randomly chlorinated PE ("pr-CPE") with from about 5% but less than 20% by weight Cl, some of which is in a crystalline PE phase, is extrudable under matching conditions with PE or PEX. Also, similarly extrudable with PE or PEX is a blend of pr-CPE ("bl-pr-CPE") and a PO rubber, in which blend the PO rubber is present in a minor proportion by weight relative to the combined weight of the pr-CPE and PO rubber.

BRIEF DESCRIPTION OF THE DRAWING

The foregoing and additional objects and advantages of the invention will best be understood by reference to the following detailed description, accompanied with schematic illustrations of preferred embodiments of the invention, in which illustrations like reference numerals refer to like elements, and in which.

DETAILED DESCRIPTION OF PREFERRED EMBODIMENTS

Figure 1:
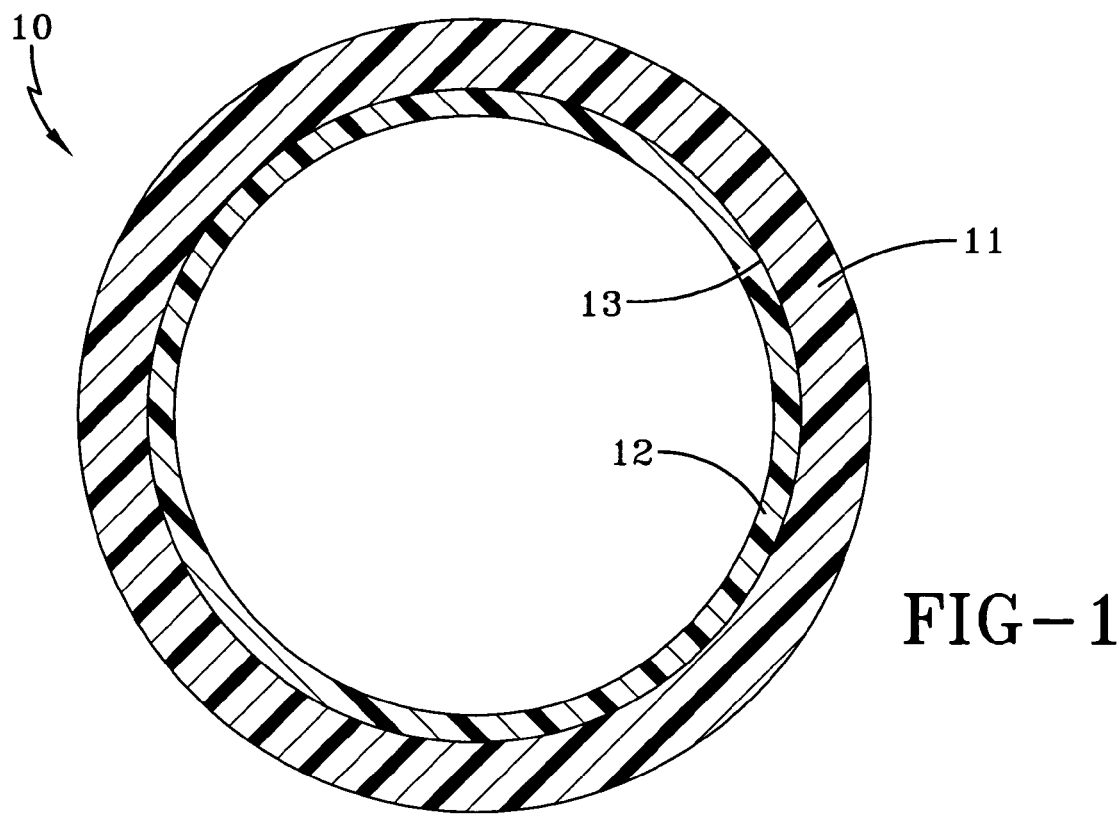
FIG. 1 is a cross-sectional view greatly enlarged and not to scale, of a twin-layer pipe having (i) an outer layer of PO and (ii) a tubular core of b-CPO, or blend of b-CPO and elastomer.

Adhesion of either a b-CPO or r-CPO or pr-CPO surface to a PO surface cannot be predicted by the particular characteristics of an interfacial agent which provides good adhesion between a polyolefin rubber dispersed in either a PVC phase or a CPVC phase, or both phases. Further, since b-CPO, r-CPO and pr-CPO containing from 5% to less than 50% by weight Cl, are each extruded at about the same temperature and pressure it was reasonable to expect that extruding polyolefin, say PEX, over b-CPE or r-CPE or pr-CPE (the corresponding chlorinated polyolefin), would maintain the integrity of the cylindrical layer of chlorinated polyolefin flowing as a tubular core beneath the overlying PEX, but the type of bond obtained is not predictable, particularly if the desired wall-thickness of the tubular core was to be less than 0.5 mm (0.020").

Moreover, though a blend of PVC/CPVC and a polyolefin rubber compatibilized with a b-CPO is readily extrudable at a temperature at which neither is degraded, one cannot predict whether such an extrudate would be satisfactorily self-adhered to a PO surface of an extrudate under matching co-extrusion conditions. Accordingly, there is no reason to expect that any chlorinated PO, and particularly PE, whether b-CPE, r-CPE or pr-CPE, or a blend of any one of the foregoing ("bl-b-CPO") would be co-extrudable to yield an extrudate in which the layers (laminae) are cohesively bonded. In a blend with a polyolefin rubber, the chlorinated PO is present in a major proportion by weight. In an analogous manner, the corresponding randomly, or partially randomly, or blocky chlorinated PP and PB, or mixtures of one with another, are co-extrudable under matching conditions for the corresponding PP and PB; and each of the former forms a cohesive bond with the contiguous unchlorinated layer.

Either the chlorinated PO, or its blend with polyolefin rubber may include conventional blending ingredient(s) in which the chlorinated PO is present in a major amount by weight, based on the weight of blended CPO. The blending ingredient(s) is preferably present in an amount less than about 20% by weight of the combined weight of compounds in the core. A preferred blending ingredient is selected from the group consisting of a lower-olefinic rubber, a lower-olefin-diene elastomer, and PVC, and is used in an amount in the range from about 1 to 10%, and may additionally include a processing aid, stabilizer, impact modifier, inert filler, and pigment used as conventional blending ingredients.

Though b-CPE, pr-CPE and r-CPE may each be formed under either the same or different conditions, one is distinguishable from the other by the distribution of its Cl content and crystallinity. Each is co-extrudable with a PO, and with PEX in particular, and each forms a cohesive bond with PEX. This is evident when a layer of b-CPE, r-CPE, or pr-CPE is sandwiched between PEX layers and the PEX layers are pulled apart in a ring peel test (ASTM F1281-99, Section 9.3.2). Hereafter, for brevity, either b-CPO, or pr-CPO, or r-CPO, or a combination thereof, or a blend of any one of the foregoing with a minor amount by weight of a conventional blending ingredient for a PO which is chlorinated, optionally including a stabilizer and impact modifier, are together referred to as "CPO/bl-CPO". Thus (i) b-CPE or a blend of b-CPE ("bl-b-CPE"); and (ii) pr-CPE or a blend of pr-CPE ("bl-pr-CPE"); and (iii) r-CPE or a blend of r-CPE ("bl-r-CPE"); any of which blends "bl-CPE" contains a minor amount by weight of a blending ingredient is referred to as "CPE/bl-CPE", in which "CPE" indicates one or more of b-CPE, r-CPE and pr-CPE, and "bl-CPE" indicates CPE with a blending ingredient. In particular, a preferred core is of bl-CPE, that is, b-CPE blended with one or more blending ingredients.

The outer layer may be any extrudable polyolefin or blend thereof which is co-extrudable with the tubular core of chlorinated polyolefin described herein. In a particular best mode of the invention, reference is made to a cylindrical PEX outer layer extruded over a cylindrical b-CPE and/or pr-CPE and/or r-CPE layer at a temperature at which each layer is hot enough to be bonded to the other, using a conventional co-extrusion system operating in the temperature range from about 150° C. to about 225° C., it being understood that another chlorinated or non-chlorinated PO outer layer (sheath) may be provided if it has extrudability without degradation, particularly if there is no mandated restriction as to the wall thickness of the finished pipe. Such polyolefins include uncross-linked PE, PP, or PB, or conventionally extrudable copolymers, or blends, of one with another. b-CPE, r-CPE and pr-CPE are most preferred because chlorinated PP, whether b-CPP, r-CPP or pr-CPP and, chlorinated polybutene, whether b-CPB, r-CPB or pr-CPB, tend to degrade even when co-extruded with PP or PB having matching extrusion conditions. Typically a tubular core of chlorinated lower polyolefin is extruded at a first mean temperature in the range from about 150° C. to 220° C. in a first extruder, and a poly(lower)olefinic outer layer is co-extensively co-extruded over the tubular core of chlorinated lower polyolefin at a second mean temperature in the range from about 150° C. to 250° C. in a second extruder. A precursor feed zone in an extruder is preferably in the range from 120° C. to 170° C.

Cross-linking in the PEX may be produced either chemically by reactive functional groups, or by free radical reaction; the former is typically effected with silane cross-linking, while the latter is effected either by irradiation or with a peroxide cross-linking agent as for example in the Engel process. Irradiative cross-linking typically occurs at room temperature by electron bombardment with critical control. Most preferred is cross-linking with vinyltrimethoxysilane or vinyltriethoxysilane groups grafted onto a PE backbone in a separate extrusion process. Pellets of the grafted PE are mixed with a masterbatch containing a catalyst, stabilizer, pigment, processing aid, antioxidant, etc. and extruded to yield a partially cross-linked PE pipe. This pipe is further cross-linked by exposure to water.

A particular extrudate comprises (i) an outer layer of PEX, and (ii) a tubular core of bl-b-CPE, the tubular core being co-extensive with essentially the entire length of the pipe; the tubular core is directly cohesively bonded to the PEX outer layer's inner surface without an additional adhesive material. The tubular core may also be CPE/bl-CPE having a sufficiently high molecular weight, and a chlorine content from about 15% to 45%, typically from 20% to 30%, to provide an extrudate at substantially the same conditions as those required to co-extrude the PEX outer layer. The molecular weight of the b-CPE, or pr-CPE, measured by melt viscosity correlation, is preferably in the range from 0.1 gm/10 min to 1000 gm/10 min, using ASTM D-1238-F; at values near the high end, that is, for highly fluid materials having a viscosity above 50 gm/10 min @ 190□C. (condition F), it may be desirable to use ASTM D-1238-E; the molecular weight of the r-CPE is in the Mooney viscosity range from about 20–140, ML(1+4) @ 121° C. (2502° F.), according to ASTM D-1646.

The b-CPE which is most preferred has (a) a melting temperature in the range from about 110° C. to about 140° C. measured by DSC (differential scanning calorimetry, and (b) an amorphous phase and a crystalline phase wherein the chlorinated polyolefin contains from about 20% to about 50% by weight bound chlorine, based on the weight of the chlorinated polyolefin. The pr-CPE, if present, has a chlorine content in the range from 5% to less than 20% by weight, based on the weight of the pr-CPE. The bl-CPE, if a blending ingredient is present, contains from about 1 to 10% by weight of a rubber selected from a lower monoolefinic rubber and a lower monoolefinic-diene rubber; and optionally, in addition, from 1 to 10% by weight of PVC, not including processing aids, stabilizers, impact modifiers, preferably an acrylic impact modifier, inert filler, pigment and other additives commonly used to optimize processability and physical properties.

A core of b-CPE provides the PEX outer layer with excellent protection because the rate of transmission ("OTR") and the permeation rate ("P") of oxygen are each much less for b-CPE than those for PEX. A representative average "OTR" for PEX is about 116.75 cc/m$^2$-day; and for b-CPE is 37.9 cc/m$^2$-day at 23° C. A representative average "P" for PEX is about 2689 cc-mil/m$^2$-day-atm; and for b-CPE (23% Cl) is 796 cc-mil/m$^2$-day-atm; for b-CPE (26% Cl) is 523 cc-mil/m$^2$-day-atm. A representative average "P" for Tyrin® randomly chlorinated PE for 20% and 30% Cl is about 4340 and 2480 cc-mil/m$^2$-day-atm respectively, all "P" being measured at 23° C. Without a protective core of b-CPE the PEX is susceptible to degradation by reaction with chlorine present in potable water as described in the article by P. Vibien et al, supra.

A typical extrudate has a nominal diameter in the range from about 7 mm (0.25") to about 25 mm (1") and thickness of its laminated wall in the range from about 1.57 mm (0.062") to about 3 mm (0.125") respectively; the wall thickness of the tubular core, measured in the radial direction, is preferably in the range from about 0.025 mm (1 mil) to about 0.25 mm (10 mils) but may be as thick as 0.5 mm for large diameter pipe. Such an extrudate is useful to carry a fluid, such as water, containing trace quantities of free chlorine (oxidizing agents) in the range from 0.1 ppm to about 5 ppm, particularly potable water, at a temperature in the range from about 5° C. to about 100° C. and a pressure in the range from about atmospheric pressure to about 790 kPa (100 psig).

Referring to FIG. 1, there is schematically illustrated a co-extruded multilayer pipe indicated generally by reference numeral 10, having an outer layer 11 and a core 12 bonded without an adhesive at interface 13; the outer layer 11 is PEX which is most commonly used for hot and cold water service. HDPE, MDPE and LLDPE may be used for cold water service provided the material specifications meet the requirements of ASTM D-2104, section 5. The core 12 is b-CPE or bl-b-CPE when the outer layer 11 is PEX; or, the core 12 may be pr-CPE or bl-pr-CPE when the outer layer 11 is PEX; or, the core 12 may be r-CPE or bl-r-CPE when the outer layer 11 is PEX; or, the core 12 may be a blend of two or more of the foregoing, optionally with other blending ingredients, when the outer layer 11 is PEX. In an analogous manner, when the outer layer 11 is PP the core 12 is preferably b-CPP or bl-CPP or a blend of both; and when the outer layer 11 is PB the core 12 is preferably b-CPB, or bl-CPB or a blend of both. Thus the blend is preferably of the same chlorinated monomer as the monomer of the PO outer layer, so that in each case the outer layer is PO and the co-extruded barrier layer is a blend of the same PO which is chlorinated. In each case, the CPO/bl-CPO may be blended with ethylene-propylene rubber and/or EPDM preferably in an amount from 1 to 10 percent by weight, and optionally in addition, with from 1 to 10 percent by weight PVC. The diene monomer is chosen from ethylidene norbornene (ENB), dicyclopentadiene (DCPDM), vinyl norbornene (VNB), or norbornadiene (NBD), most preferably ENB. Most preferred blends are (i) b-CPE/PVC/EPDM and (ii) b-CPE/EPDM.

In another less preferred embodiment, a twin-layered pipe may be formed by extruding a cylindrical PEX outer layer over a cylindrical coating of polymer adhesive which in turn is extruded over a b-CPE core extruded at a temperature at which each layer is hot enough to be self-bonded to the other, using a conventional co-extruder. Extrudable polymers which effectively bond to both PEX and CPE/bl-CPE are graft copolymers of a lower polyolefin, preferably PE, or ethylene vinyl acetate and an unsaturated carboxylic acid or derivative thereof, which latter is referred to as an "active stub". The graft copolymer with the active stub provides requisite bonding with the surface of the polymer upon which it is coated at a sufficiently high temperature to provide the desired bond. It is believed the desired bond is obtained either by affecting the polarity of the graft copolymer or by reaction of the group on the active stub. Examples of the unsaturated carboxylic acid include acrylic acid, methacrylic acid, maleic acid, dicarboxylic acid; derivatives thereof include halides, amides, imides, anhydrides or esters. Maleic anhydride on a backbone of PE, and methyl acrylate on a backbone of ethylene vinyl acetate are most preferably used.

Figure 2:
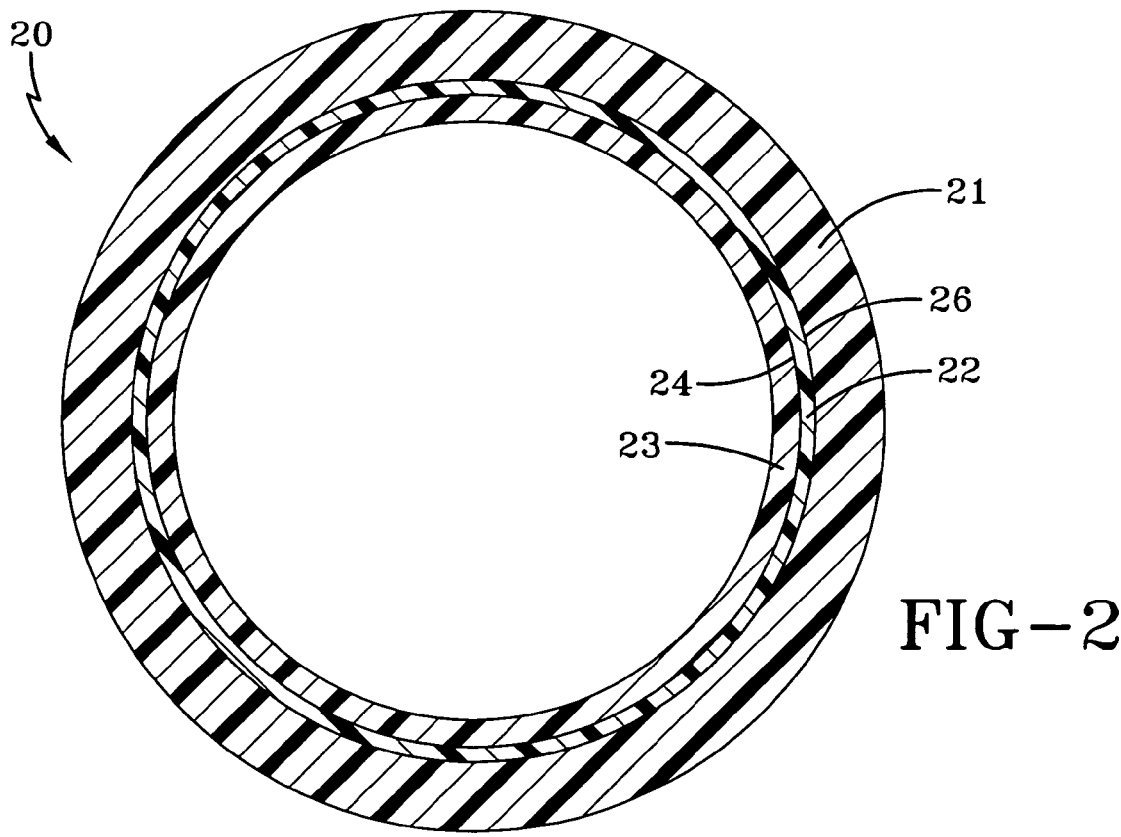
FIG. 2 is a cross-sectional view greatly enlarged and not to scale, of a laminated pipe having (i) an outer layer of PO, (ii) an intermediate coating of an adhesive and (iii) a tubular core of b-CPO, or blend of b-CPO and elastomer.

Referring to FIG. 2, there is schematically illustrated a co-extruded twin-layer pipe indicated generally by reference numeral 20, having an outer layer 21 of PO, an intermediate coating of adhesive 22, and a tubular core 23 of b-CPO or bl-CPO. The outer PO layer 21 is most preferably PEX, but may be a copolymer of plural non-chlorinated lower polyolefins, as described above. The intermediate coating 22 is an adhesive which has been found to be at least partially miscible with both PO and CPO/bl-CPO so as to be so compatible with each (the PO outer layer and the CPO/bl-CPO core) as to form a cohesive bond therebetween when co-extruded with the PO and the CPO/bl-CPO. By "cohesive bond" is meant that the bond between each contiguous layer, namely of adhesive/b-CPO at interface 24, and of adhesive/PO at interface 26, is so strong that peeling the layers apart does not result in a clean separation of adhesive and b-CPO, or adhesive and PO at either interface 24 or 26, but a separation which includes portions of adhesive on one or the other (b-CPO or PO) which may themselves be damaged, or remain substantially undamaged. Thus when the core 23 is PEX and the adhesive coating 22 is maleic anhydride modified LLDPE or HDPE, peeling results in portions of the adhesive adhered to the core, or, portions of the adhesive adhered to the PEX. Most preferred is a core of b-CPE, or b-CPE blended with an EPDM rubber.

In each of the embodiments in which the core is CPE/bl-CPE, the bl-CPE contains a polyolefin rubber as the predominant minor blending ingredient, the CPE (r-CPE, pr-CPE or b-CPE) preferably present in the range from about 75 to about 99 parts by weight per 100 parts (phr) of blend, more preferably from about 90 to 99 phr, the remaining components of the blend being PO-rubber, PVC, processing aids, stabilizers, inert filler, pigment and the like. The PO-rubber may be a polyolefin copolymer from monomers such as ethylene and propylene, or a terpolymer with a straight chain or bicyclic diene which provides up to about 10 weight % of olefin, for cross-linking, such as ENB or DCPD, 1,4 hexadiene (4,4 HD) or VNB or NBD.

The outer layer of PO, and PEX in particular, is preferably stabilized against thermal and oxidative degradation by known thermal stabilizers, antioxidants, antiozonants and the like which may be present in the range from about 10 ppm to about 7 parts per hundred parts of PO provided the concentration of the additive does not adversely affect the bonding of the PO outer layer 11 to the core layer 12. The outer layer and core are preferably stabilized with different stabilizers. PO is preferably stabilized with primary antioxidants such as hindered phenols including those commercially available as Irganox 1010, 1076 and B215; with secondary antioxidants functioning as thermal processing stabilizers including those commercially available as Irgafos 168, Irganox PS802; and additionally with hindered amine light (UV) stabilizers commercially available as Tinuvin 111, and pigments such as titanium dioxide, and carbon black as well as lubricants such as fluorinated flow aids. The b-CPE, in addition to the foregoing, is preferably stabilized with salts of lower carboxylic acids such as alkali metal citrates, salts of phosphoric acid, polyols, or epoxidized oils, and a thermal stabilizer such as a dibutyl tin stabilizer in an amount from about 0.01 to about 2 parts by weight per 100 parts PO. These other stabilizers may be used in amounts from about 0.1 to about 7 parts by weight. Lubricants such as Dynamar® fluorinated flow aids, paraffin waxes, low molecular weight polyethylene, oxidized polyethylenes, fatty acids and their salts, fatty alcohols, metal soaps, fatty amides, fatty esters, can be included in both PEX and b-CPO. Fillers are optional and include clay, silica, wollastonite, mica, barytes, calcium carbonate, carbon black, titanium dioxides, and talc. EP or EPDM rubber may be added to the core as an impact modifier.

The co-extrusion of a PEX internally coated with a CPE/bl-CPE tubular core is effected with plural extruders feeding into a multi-layer pipe die head such as is commercially available from Rollepaal and illustrated in their sales brochure. The temperature of each of plural zones along the longitudinal axial length of the die head allows the temperature of each zone to be adjusted so as to gradually heat the laminate being formed. If a twin-layer pipe is to be formed, then two extruders are used; a first extruder feeds PEX into a first port in the die head, and a second extruder feeds bl-b-CPE into a second port in the die head. From the second port, the bl-b-CPE flows into distribution branches which are in open communication with an inner annular zone, and over a frustoconical mandrel. From the first port, the PEX flows into distribution branches which are in open communication with an outer annular zone and over the bl-b-CPE flowing over the frustoconical mandrel. When the tubular inner core of bl-b-CPE contacts the inner surface of the outer PEX pipe being formed, a twin-layered laminate is formed.

In an analogous manner, if a tri-layer pipe is to be formed, then three extruders are used; a first extruder feeds PEX into a first port in the die head; a second extruder feeds bl-b-CPE into a second port in the die head; and a third extruder feeds adhesive into a third port in the die head. As in the twin-layer pipe, cylindrical flow of hot PEX and bl-b-CPE flow over the frustoconical mandrel, but in addition, adhesive is flowed in a cylindrical coating over the mandrel and between the PEX and bl-b-CPE layers. The two polyolefin layers are thus brought into contact with the adhesive to form a twin-layered pipe with an adhesive sandwiched therebetween.

In the following illustrative examples, reference to "parts" refers to parts by weight unless otherwise indicated.

Extrusion of PEX Pipe

A commercially available silane grafted polyethylene base resin having a density of 0.945 g/cm3 measured according to ASTM D1505 and a melt index of 35 g/10 min measured according to ASTM D1238 Condition F or ASTM D1928 Procedure C was mixed with commercially available catalyst masterbatch having a melt index of 1.5 g/10 min measured according to ASTM D1238 Condition E and a density of 0.935 g/cm3 measured according to ASTM D1505 or ASTM D1928 Procedure C. The mixture contained 96 wt % silane grafted polyethylene and 4 wt % catalyst masterbatch. This blend was fed into a hopper located on a 2½ Davis-Standard (name of machine) single screw extruder. The extruder was equipped with a general purpose polyolefin processing screw, breaker plate and a multi-purpose 1" (2.54 cm) die. A single layer pipe was successfully extruded under the processing conditions set forth in Table 1 below:

TABLE 1

| Variable | Conditions |
|---|---|
| Zone 1 setpoint | 165.5° C. (330° F.) |
| Zone 2 setpoint | 168.3° C. (335° F.) |
| Zone 3 setpoint | 171.1° C. (340° F.) |
| Zone 4 setpoint | 173.9° C. (345° F.) |
| Die 1 setpoint | 187.8° C. (370° F.) |
| Die 2 setpoint | 187.8° C. (370° F.) |
| Die 3 setpoint | 190.5° C. (375° F.) |
| Die 4 setpoint | 190.5° C. (375° F.) |
| Screw RPM | 30 |
| Screw Amps | 7 |
| Rate | 40 Kg/hr (88 lbs/hr) |

Pipe samples were then post cross-linked by placing them in a water bath set to 82° C. for 16 hours. The pipe thus obtained has a gel content in excess of 75%, as measured according to ASTM D2765.

Extrusion of b-CPE Pipe

A commercially available polyethylene resin having a density of 0.961 and a melt index of 8.4 g/10 min according to ASTM D1238-E was chlorinated as described in the '406 patent to provide a blocky CPE (b-CPE) having 30% by weight bound Cl. One hundred parts of this resin was mixed in a Henschel mixer at room temperature with 1.0 parts of titanium dioxide and 0.25 parts of a commercially available hindered phenolic antioxidant. This formulation is successfully processed into ¾" SDR-11 pipe (see Table 1 ASTM D-2846) on a Leistritz 27 parallel twin screw extruder under the conditions set forth in Table 2 below:

TABLE 2

| Variable | Conditions |
|---|---|
| Barrel Zone 1 setpoint | 121.1° C. (250° F.) |
| Barrel Zone 2 setpoint | 123.9° C. (255° F.) |
| Barrel Zone 3 setpoint | 126.7° C. (260° F.) |
| Barrel Zone 4 setpoint | 129.4° C. (265° F.) |

TABLE 2-continued

| Variable | Conditions |
|---|---|
| Barrel Zone 5 setpoint | 132.2° C. (270° F.) |
| Barrel Zone 6 setpoint | 135° C. (275° F.) |
| Barrel Zone 7 setpoint | 137.8° C. (280° F.) |
| Die Zone 1 setpoint | 140.5° C. (285° F.) |
| Die Zone 2 setpoint | 140.5° C. (285° F.) |
| Die Zone 3 setpoint | 140.5° C. (285° F.) |
| Screw RPM | 60 |
| Extrusion Rate | 7.05 Kg/hr (15.5 lb/hr) |
| Melt Temperature | 160° C. (320° F.) |

Partially randomly chlorinated CPE (pr-CPE) may be prepared at a suitable temperature in a manner analogous to that used to prepare b-CPE and chlorination limited to 12% in the pr-CPE. 100 parts of the pr-CPE may be blended with 5 parts of EPDM rubber to yield a blend which is extrudable under conditions suitable for co-extrusion with PEX.

Co-Extrusion of PEX/b-CPE Pipe

In a manner analogous to that described above, the 1" (2.54 cm) extrusion die internal components were modified to allow for a 2-layer piping structure. The pipe structure was set to extrude a thin b-CPE layer inside of a thicker cross-linkable silane grafted polyethylene outer layer.

A commercially available silane grafted polyethylene base resin having a density of 0.945 g/cm3 measured according to ASTM D1505 and a melt index of 35 g/10 min measured according to ASTM D1238 Condition F was mixed with commercially available catalyst masterbatch having a melt index of 1.5 g/10 min measured according to ASTM D1238 Condition E and a density of 0.935 g/cm3 measured according to ASTM D1505 or ASTM D1928 Procedure C. The mixture contained 96 wt % silane grafted polyethylene and 4 wt % catalyst masterbatch. This blend was fed into a hopper located on a 2½ Davis-Standard single screw extruder, the first of two extruders providing extrudates to the modified extrusion die. The extruder was equipped with a general purpose polyolefin processing screw and breaker plate. Processing conditions are set forth in Table 3 below:

TABLE 3

| Variable | Conditions |
|---|---|
| Zone 1 setpoint | 165.5° C. (330° F.) |
| Zone 2 setpoint | 168.3° C. (335° F.) |
| Zone 3 setpoint | 171.1° C. (340° F.) |
| Zone 4 setpoint | 173.9° C. (345° F.) |
| Die 1 setpoint | 187.8° C. (370° F.) |
| Die 2 setpoint | 187.8° C. (370° F.) |
| Die 3 setpoint | 190.5° C. (375° F.) |
| Die 4 setpoint | 190.5° C. (375° F.) |
| Screw RPM | 25 |
| Screw Amps | 7 |

A 1½ Davis Standard single screw extruder (the second) was used to extrude b-CPE pellets to provide a b-CPE extrudate to the modified extrusion die. The b-CPE pellets had a Cl content of 26.4% by weight and were prepared by standard melt processing of b-CPE resin made from polyethylene resin chlorinated as described in the '406 patent. The b-CPE resin was melt processed under the conditions set forth in Table 4 below, and fed into a sideport of the 1" (2.54 cm) extrusion die.

TABLE 4

| Variable | Conditions |
|---|---|
| Zone 1 setpoint | 165.5° C. (330° F.) |
| Zone 2 setpoint | 168.3° C. (335° F.) |
| Zone 3 setpoint | 171.1° C. (340° F.) |
| Zone 4 setpoint | 173.9° C. (345° F.) |
| Clamp setpoint | 176.7° C. (350° F.) |
| Die 2 setpoint | 179.4° C. (355° F.) |
| Screw RPM | 10 |
| Screw Amps | 6.3 |
| Rate for 2-layer pipe | 40 Kg/hr (84 lbs/hr) |

Dimensional Conformance:

The following dimensions (given in inches in parentheses) are specified by ASTM F-876 and F-877 for single layer (wall made from a single material) 19 mm SDR-9 PEX pipe:

| Nominal dia. | Outside dia. | Wall thickness |
|---|---|---|
| 19 mm (0.75") | 22.22 mm ± 0.1 (0.875" ± 0.004) | 2.47 mm + 0.25 (0.097" + 0.010) |

The following dimensions for 19 mm (0.75") nominal diameter pipe having an outside diameter of 22.22±0.1 mm (0.875"±0.004), are specified for two tubular twin-layer co-extrudates "A" and "B", each conforming to the specifications set forth in ASTM F-876, and F-877 except that they are met in the multi-layered pipe made from two or more materials. However, the tubular cores have different wall thicknesses (given in inches in brackets) in Table 5 below:

TABLE 5

| Tube | PEX Wall thk. range, mm | Core Wall thk., mm | Overall wall thk. range, mm |
|---|---|---|---|
| A | 2.47–2.67 (0.097–0.105) | 0.05 (0.002) | 2.52–2.72 (0.099–0.107) |
| B | 2.47–2.62 (0.097–0.103) | 0.10 (0.004) | 2.57–2.72 (0.101–0.107) |

Thus, two barrier layers having different wall thicknesses are extruded so as to meet the required specifications.

Comparable Flexural Modulus:

In a manner analogous to that for production of the twin-layered pipes A and B above, a twin-layered pipe "C" having the same 19 mm (0.75") nominal tubing size is produced with PEX, melt index 35 g/10 min (ASTM D1238-F), having a tubular core of b-CPE with 27.2% bound Cl, wall thickness of 0.127 mm (0.005") and an overall wall thickness of 2.54 mm. The flexural modulus was compared to that of an extruded pipe "D" of the same PEX having the same wall thickness, and nominal and outside diameters. Tests were conducted according to ASTM D790-95A, Method 1, Procedure A using a 5.08 cm (2") span, rate=1.27 mm/min (0.05 in/min) and L/d=16/1 for flexural modulus, which is the average of five samples, presented in Table 6 below:

TABLE 6

| Tube | Overall thk., mm | Core Wall thk., mm | Flexural modulus |
|---|---|---|---|
| D | 2.52 (0.99) | no core | 678.4 ± 143.4 MPa (98,400 ± 20,800 psi) |
| C | 2.60 (0.102) | 0.127 (0.005) | 737.7 ± 70.3 MPa (107,000 ± 10.200 psi) |

It is evident that there is only about a 8.7% increase in flexural modulus with the core of b-CPE.

Cohesively Bonded Tri-Layered Pipe:

Samples of tri-layered pipe (three polyolefinic layers) were prepared by using three extruders which supplied polymer extrudates X, Y and Z respectively to a die having a design similar to that of a Rollepaal tri-layer pipe die head, to produce a tri-layer pipe X/Y/Z in which layer Y is sandwiched between layers X and Z, and Z is the inner layer. The temperature in each of the extruders is staged to provide an operating range from about 150° C. to 190° C. Referring to FIG. 2, a poly(lower)olefin layer is substituted for the adhesive coating 22. The following tri-layer pipes are made:

A. PEX is supplied by two extruders in which X=Z=PEX; the third extruder supplies b-CPE (Y=b-CPE) to produce a b-CPE layer 0.05 mm (0.002") thick sandwiched between PEX layers each about 0.86 mm (0.034") thick.

Four samples (1 to 4 in Table 7 below) of tri-layered pipe were prepared with the 0.86 mm PEX layers having a 0.05 mm layer of b-CPE sandwiched between them. Starting with PE having three different densities and melt indices ("m. i." ranging from 0.35 to 8.4 gm/10 min according to ASTM D-1238-E), four b-CPEs were produced with three different Cl contents. Each b-CPE was extruded as a layer between the PEX layers. The strength of the PEX to b-CPE bond for each sample was measured at 23° C. and 95° C. according to section 9.3.2 in ASTM F1281-99.

B. In an analogous manner, tri-layer pipe X/Y/Z is produced in which two extruders supply PEX as layers X and Z, and the third extruder supplies Y=r-CPE or pr-CPE to produce PEX/r-CPE/PEX and PEX/pr-CPE/PEX tri-layered pipes respectively, having the same thicknesses as the pipe produced in "A" above. In sample 5, in Table 7 below, the r-CPE used is Tyrin 3615P available from Dupont Dow Elastomers. The strength of the PEX to Tyrin bond was measured at 23° C. and 95° C. according to section 9.3.2 in ASTM F1281-99 (given in U.S. units in brackets).

TABLE 7

| Sample No. | M. I. of start'g PE gm/10 min | Density of PE g/cm$^3$ | % Cl in b-CPE | Break @ 23° C. N/m | Break @ 95° C. N/m |
|---|---|---|---|---|---|
| #1 | 8.4 | 0.961 | 22.8 | 2556.8 ± 52.5 (14.60 ± 0.30) | 509.6 ± 175 (2.91 ± 1.0) |
| #2 | 8.4 | 0.961 | 32.8 | 1683. ± 31.5 (9.61 ± 0.18) | 802.1 ± 175 (4.58 ± 0.1) |
| #3 | 0.75 | 0.963 | 32.9 | 1525.3 ± 63.1 (8.71 ± 0.36) | 655. ± 52 (3.74 ± 0.3) |
| #4 | 0.35 | 0.955 | 27.0 | 1926.4 ± 43.8 (11.0 ± 0.25) | 900.1 ± 52 (5.14 ± 0.3) |
| #5 | — | — | 36. | 1943.9 ± 119.1 (11.1 ± 0.68) | 227.7 ± 15 (1.30 ± 0.09) |

Examination of the surfaces indicates cohesive bonding between the PEX and sandwiched layer.

C. In an analogous manner as in A and B above, tri-layer pipe may be produced when PP is supplied by two extruders in which X=Z=PP, and a third extruder supplies b-CPP (Y=b-CPP) to produce a b-CPP layer 0.5 mm thick sandwiched between PP layers each about 11 mm thick. Similarly, the third extruder may supply Y=r-CPP or pr-CPP to produce PP/r-CPP/PP and PP/pr-CPP/PP tri-layered pipes respectively. Samples of each of the tri-layered pipes, if tested as indicated above, will show cohesive bonding between the PP and the b-CPP, pr-CPP and r-CPP layers.

D. Three extruders supply polymer extrudates X, Y and Z respectively which are combined in a die having a design similar to that of a Rollepaal tri-layer pipe die head to produce a tri-layer pipe X/Y/Z in which layer Y is supplied between outer layer X and the inner layer Z.

X=HDPE; Y=PEX and Z=b-CPE to produce a b-CPE layer 0.5 mm thick, a PEX layer about 2.54 mm thick, and a HDPE layer about 1.5 mm thick. The temperature in the extruders is staged to provide an operating range from about 150° C. to 190° C.

Samples of the pipe are tested as indicated above pulling apart the PEX and HDPE layers. Examination of the surfaces indicates portions of HDPE remain on the PEX indicating cohesive bonding between the PEX and the HDPE.

Adhesively Bonded Twin-Layer Pipe:

E. PEX, adhesive "Y" and b-CPE are supplied by each of three extruders in which X=PEX; Y=maleic anhydride modified LLDPE, and Z=b-CPE to produce a b-CPE layer 0.5 mm thick, a PEX layer about 2.54 mm thick, and an adhesive layer about 0.05 mm thick. Upon peeling the outer layers apart, examination of the surfaces indicates portions of adhesive on both the PEX and the b-CPE surfaces indicating cohesive bonding between the PEX and the adhesive, as well as between the b-CPE and the adhesive.

Tri-Layer Pipe with Outermost Layer Bonded with Adhesive:

F. Samples of tri-layered pipe may be prepared by using four extruders. Three extruders supply polymer extrudates X, Y and Z respectively and a fourth supplies adhesive "Q". The extrudates may be combined in a Rollepaal-type four-layer pipe die head to produce a tri-layer pipe X/Q/Y/Z in which layer Q is supplied between layers X and Y, and Z is the inner layer.

G. PEX, b-CPE, Q=maleic anhydride modified LLDPE, and EVOH are supplied by each of four extruders to form X/Q/Y/Z in which X=EVOH; Q=adhesive, Y=PEX and Z=b-CPE to produce a b-CPE layer 0.05 mm thick, a PEX layer about 2.54 mm thick, an adhesive layer about 0.05 mm thick, and a EVOH layer about 0.05 mm thick. The temperature in the extruders is staged to provide an operating range from about 150° C. to 190° C.

While certain representative embodiments and details have been shown for the purpose of illustrating the invention, it will be apparent to those skilled in this art that various changes and modifications may be made therein without departing from the spirit or scope of the invention.

What is claimed is:

1. A pipe of arbitrary length and cross-section comprising, a poly(lower)olefinic outer layer and a tubular core; the tubular core being coextensive with essentially the entire length of the pipe, the outer layer bonded to the tubular core consisting of a chlorinated lower polyolefin selected from the group consisting of a randomly chlorinated polyolefin (r-CPO), a partially randomly chlorinated polyolefin (pr-CPO) and a blocky chlorinated polyolefin (b-CPO), wherein the lower olefin has from 2 to 4 carbon atoms and the chlorine content of the tubular core is in the range from 5 to about 50 percent by weight.

2. The pipe of claim 1 wherein the outer layer is cross-linked polyethylene wherein said cross-linked polyethylene is made by grafting vinyltrimethoxysilane or vinyltriethoxysilane groups onto a polyethylene backbone and exposing to water, and the tubular core consists of a polymer selected from the group consisting of a randomly chlorinated polyethylene (r-CPE), a partially randomly chlorinated polyethylene (pr-CPE) and a blocky chlorinated polyethylene (b-CPE).

3. The pipe of claim 1 wherein the tubular core has a wall thickness, measured in the radial direction, in the range from 0.025 mm to 0.5 mm and the wall thickness of the outer layer is essentially the same as the nominal wall thickness of conventional poly(lower)olefinic pipe having the same nominal diameter.

4. The of claim 2 having a nominal diameter in the range from about 7 mm (0.25 in) to about 152 mm (6 in) and a wall thickness in the range from about 1.57mm (0.062 in) to about 17 mm (0.681 in).

5. The pipe of claim 4 wherein the outer layer is cross-linked polyethylene (PEX) and the tubular core consisting of blocky chlorinated polyethylene (b-CPE).

6. The pipe of claim 5 wherein the tubular core consists of a blocky chlorinated polyethylene (b-CPE) having (i) a melting temperature in the range from about 110° C. to about 140° C. measured by differential scanning calorimetry, and (ii) an amorphous phase and a crystalline phase wherein the chlorinated polyethylene contains from about 15% to about 50 weight percent bound chlorine, based on the weight of the chlorinated polyethylene.

7. The pipe of claim 5 wherein the tubular core has a wall thickness such that the flexural modulus of the pipe is no more than 20% greater than the flexural modulus of conventional PEX pipe having the same nominal diameter.

8. The pipe of claim 5 including, in addition, a third layer of poly(lower)olefin directly cohesively bonded to the cross-linked polyethylene layer's outer surface.

9. The pipe of claim 4 further including a third layer of a poly(lower)olefin wherein the outer layer of poly(lower)olefin and the third layer are bonded in any relative order with respect to the tubular core.

10. A pipe of arbitrary length and cross-section comprising, a poly(lower)olefinic outer layer and a tubular core with an intermediate layer therebetween; the tubular core and intermediate layer being coextensive with essentially the entire length of the pipe, the poly(lower)olefinic layer bonded to the intermediate layer which, in turn, is bonded to the tubular core; the intermediate layer comprising a polymeric adhesive, the tubular core consisting of a chlorinated lower polyolefin selected from the group consisting of a randomly chlorinated polyolefin (r-CPO), a partially randomly chlorinated polyolefin (pr-CPO) and a blocky chlorinated polyolefin (b-CPO), wherein the lower olefin has from 2 to 4 carbon atoms.

11. The pipe of claim 10 wherein the adhesive layer is a graft copolymer of a lower polyolefin or ethylene vinyl acetate said graft copolymer having an active stub selected from the group consisting of an unsaturated carboxylic acid and a derivative thereof.

12. The pipe of claim 11 wherein the lower polyolefin is selected from the group consisting of polyethylene and polypropylene, and the active stub is selected from the group consisting of acrylic acid, methacrylic acid, maleic acid, dicarboxylic acid, halides, amides, imides, anhydrides and esters thereof.

13. A method of forming an elongated hollow body of arbitrary length and cross-section comprising, extruding a tubular core consisting of chlorinated lower polyolefin at a first mean temperature in the range from about 150° C. to 225° C., the chlorinated lower olefin being selected from the group consisting of a randomly chlorinated polyolefin (r-CPO), a partially randomly chlorinated polyolefin (pr-CPO) and a blocky chlorinated polyolefin (b-CPO), wherein the lower olefin has from 2 to 4 carbon atoms; co-extruding a poly(lower)olefinic outer layer co-extensively with the tubular core of chlorinated lower polyolefin at a second mean temperature in the range from about 150° C. to 250° C. above the first mean temperature; and, removing a co-extrudate having the outer layer cohesively bonded to the tubular core.

* * * * *

UNITED STATES PATENT AND TRADEMARK OFFICE
CERTIFICATE OF CORRECTION

PATENT NO. : 7,160,593 B2
APPLICATION NO. : 10/616421
DATED : January 9, 2007
INVENTOR(S) : Girish T. Dalal et al.

It is certified that error appears in the above-identified patent and that said Letters Patent is hereby corrected as shown below:

In claim 4, column 16, line 23, please insert --pipe-- after the word "The".

Signed and Sealed this

Twentieth Day of March, 2007

JON W. DUDAS
*Director of the United States Patent and Trademark Office*